United States Patent
Schnizler, Jr.

[15] 3,695,344
[45] Oct. 3, 1972

[54] HEAT INSULATION MEANS FOR POWER TOOLS

[72] Inventor: Albrecht Schnizler, Jr., Nuertingen, Germany

[73] Assignee: Metabowerke Kg Closs, Rauch & Schnizler, Nuertingen, Wuerttemberg, Germany

[22] Filed: Aug. 27, 1970

[21] Appl. No.: 67,410

[30] Foreign Application Priority Data

Sept. 3, 1969 Germany .........G 69 34 527.3

[52] U.S. Cl. ................165/47, 143/68 F, 143/157 C, 310/43, 310/50
[51] Int. Cl. .............................................B27b 19/08
[58] Field of Search .........310/50, 43, 64, 65; 143/60, 143/68 R, 68 E, 68 F, 70, 71, 84 F, 84 J, 156, 156 A, 157 C; 165/69, 134, 135, 136, 47

[56] References Cited

UNITED STATES PATENTS

| | | |
|---|---|---|
| 3,121,813 | 2/1964 | Pratt et al. ...................310/50 |
| 3,404,574 | 10/1968 | Stelljes .................143/68 F X |
| 3,533,600 | 10/1970 | Gerson ....................310/50 X |
| 3,417,469 | 12/1968 | Cousins et al.........310/50 UX |

*Primary Examiner*—Andrew R. Juhasz
*Assistant Examiner*—James F. Coan
*Attorney*—W. G. Fasse

[57] ABSTRACT

The invention relates to power tools, for example, a hand operated jig saw, having a housing of heat sensitive plastics material. A heat insulating layer of duroplastics is arranged intermediate the points of contact between said housing and members of the tool which are subject to heat-up during the operation of the tool, especially the bearing means such as a sleeve bearing.

5 Claims, 9 Drawing Figures

INVENTOR
ALBRECHT SCHNIZLER
BY *[signature]*
ATTORNEY

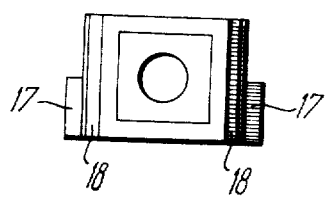
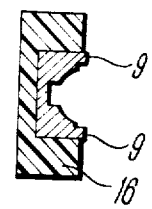
Fig. 6   Fig. 7
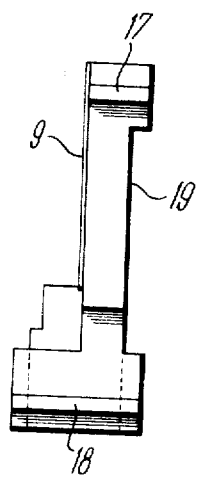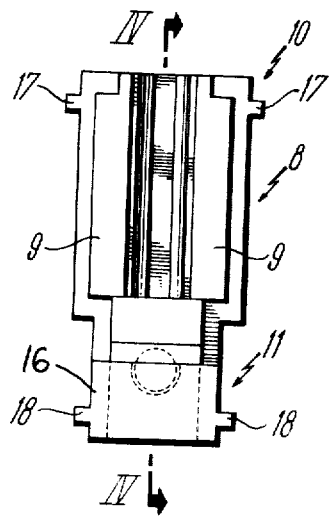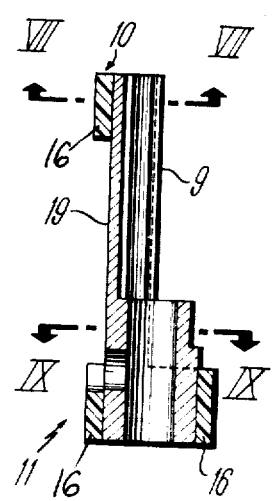
Fig. 5   Fig. 3   Fig. 4
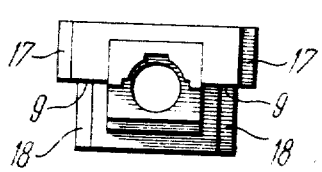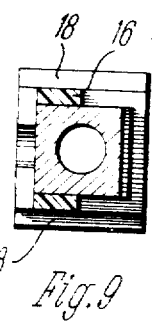
Fig. 8   Fig. 9
INVENTOR
ALBRECHT SCHNIZLER

HEAT INSULATION MEANS FOR POWER TOOLS

The present invention relates to a power tool, more especially, to a hand operated power tool such as a jig saw. Such power tool comprises a housing made of heat sensitive material, for example, plastics. The members of the tool which during its operation are subject to being heated, for example, the bearings and the like are supported in the housing and held in a fixed position in such housing.

Especially electrically driven hand operated tools are constructed so as to have a longitudinally divided housing because this results in an inexpensive production since the two housing portions or shells may be made of thermoplastics material in an injection molding process. The individual members of the tool, such as the motor, the armatur, the bearings, the gears, and switches and so on are assembled into the tool by inserting them into one of the shells of the housing where these members are fixed in their desired position by means of ribs provided on the inside surface of the housing shells. Thus, the tool members are fixed securely in their positions when both shells are secured to each other, for example, by means of screws.

However, thermoplastics material have a tendency to assume a plastic state or condition already at relatively low temperatures. As a result, such tool members as gears and bearings and the like which dissipate a substantial amount of heat cannot be retained in fixed positions in the housing shells because the latter are deformed by said dissipated heat.

In view of the foregoing it is the main object of the invention, to overcome the outlined drawbacks.

It is yet another object of the invention to avoid the deformation of the housing shells by the heat developed by individual tool members so that such members will be retained in their fixed positions in the housing shells. According to the invention there is provided a power tool in which the parts or members which are subject to heating during the operation or which develop heat during the operation are separated from the heat sensitive housing by means of a heat insulating layer. Especially, the parts which are subject to heating or which develop heat during the operation are surrounded by a heat insulating layer at least in those areas in which said members are in contact with the heat sensitive housing. It is suitable to provide said members with the heat insulating layer by inserting the members into a mold and applying the heat insulating layer to the members under pressure whereby either the members are covered completely or partially.

A material suitable for use as an insulating layer according to the invention is a so called duroplastics material which will retain its given shape even at elevated temperatures such as will occurr due to the heat generated in a bearing or a similar tool member. Furthermore, these duroplastics have a very low conductivity. Therefore, the heat generated in the tool member, such as a bearing, is prevented from passing to the housing shells made of thermoplastics material. The construction according to the invention is especially suitable for use in connection with a jig saw comprising a sleeve bearing guide member subject to substantial heating during operation. In one embodiment of the invention the sleeve bearing guide member of a jig saw is adapted for contacting the housing in a bearing area and in a guide area. The bearing area is completely surrounded by a duroplastics material whereas the guide area is surrounded on at least two sides by such a duroplastics heat insulating material. In order to assure a secure retaining of the members surrounded by said duroplastics material in the thermoplastics housing ribs are provided in the duroplastics insulating layer. The housing shells are provided with correspondingly shaped recesses into which said ribs fit in a form closing manner.

In order that the invention may be clearly understood, it will now be described, by way of example, with reference to the accompanying drawings, wherein:

FIGS. 3 to 9 illustrate different views and sections through the sleeve bearing guide member of the jig saw.

Figures 1, 2:
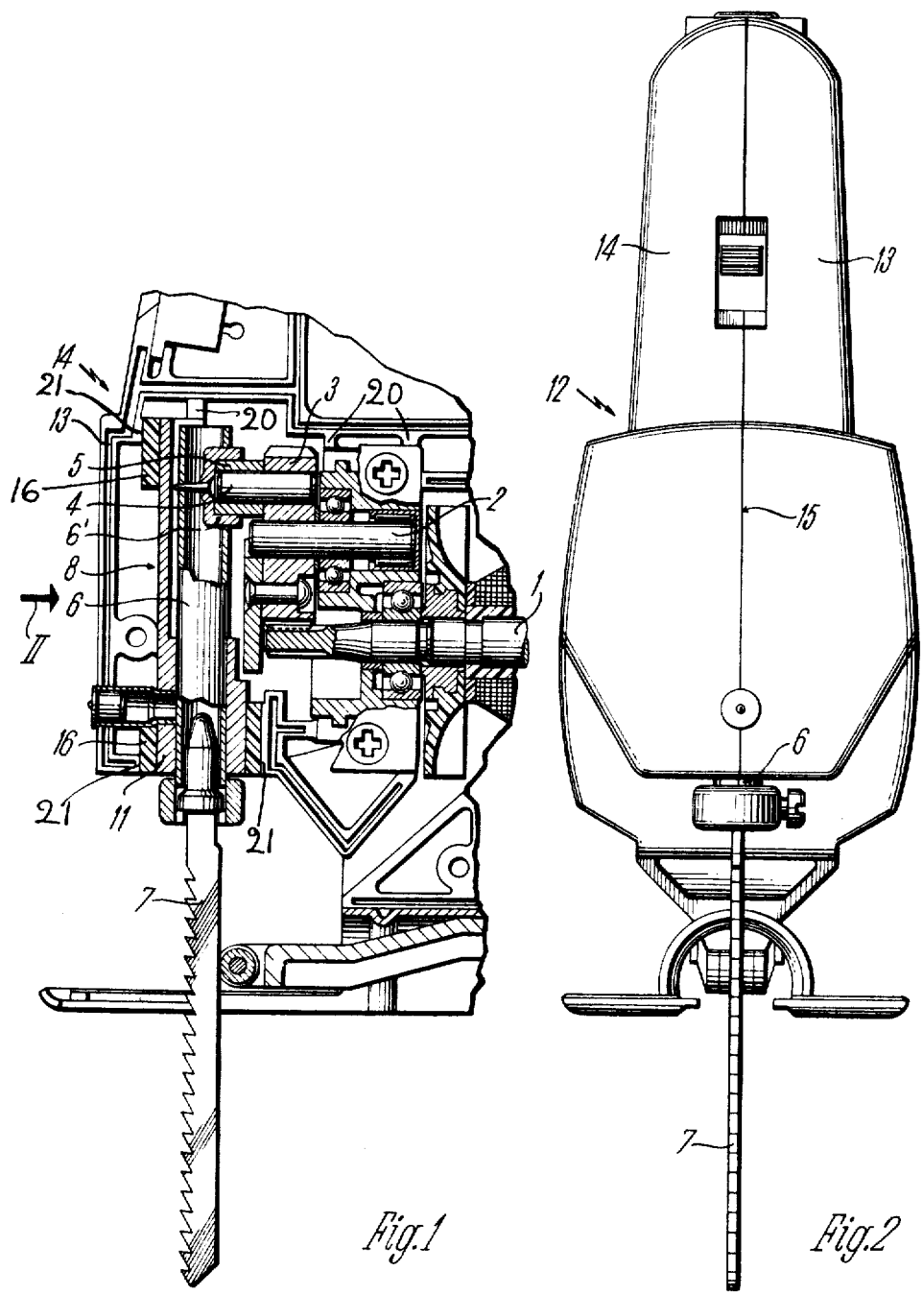
FIG. 1 illustrates a partial longitudinal sectional view through a jig saw.
FIG. 2 is a front face view of a jig saw as seen in the direction of the arrow II in FIG. 1.

The power tool illustrated for example as a jig saw, comprises a drive shaft 1 which drives a gear 3 supported on an axle 2, by means of an eccentric stud 4 supported in said gear 3. The eccentric stud 4 drives a saw blade 7 up and down in a sleeve bearing guide member 8 by means of a sliding member 5 and a driver rod 6. The sliding member 5 grips into a guide member 6' rigidly connected to the driver rod 6. The sleeve bearing guide member 8 is subject to being heated due to the heat generated during the operation of the jig saw as a result of the friction between the gliding members, more specifically, the friction between the guide member 6' and the glide path 9 in the guide area 10 as well as the friction of the driver rod 6 in the bearing area 11.

Substantially, all of the moving parts except the saw blades 7 are surrounded by housing 12 which comprises two housing shells 13 and 14 each shell forming one half of the housing. The two shells are connected to each other along a plane represented by a line 15 (FIG. 2). Such connection may, for example, be by means of screws and is well known in the art.

The inside of the shells 13, 14 are provided with ribs 20 and shoulders 21 into which the tool members, such as the bearings, switch means, the armatur and especially the sleeve bearing guide member 8, are inserted and rigidly held. In order to prevent that the sleeve bearing guide member 8 dissipates its heat directly to the housing shells 13 and 14 made of thermoplastics material, the invention provides a heat barrier or heat insulating layer 16 between the sleeve bearing guide member 8 and the housing 12. The heat barrier 16 is made of duroplastics synthetic material which is not affected in its properties, especially in its shape retaining properties by the heat occurring around the sleeve bearing guide member 8 and which therefore retains its shape.

As may be seen from FIGS. 3 to 9 the sleeve bearing guide member 8 which will normally be a metal member is surrounded by the heat barrier 16 that is by the duroplastics synthetic material, which is applied to the sleeve bearing guide member 8 by inserting it into a mold and applying the duroplastics material under pressure. It will be noted from FIG. 3 to 9 that the heat barrier 16 is provided especially at those points or areas in which the tool members are in contact with the housing shells 13 and 14, more specifically, where the entire sleeve bearing guide member 8 is held in the housing 12. At the top of FIGS. 3 and 4 there is shown a guiding area 10 and at the lower portion of FIGS. 3 and 4 there is shown a bearing or supporting area 11. It will be noted that the heat barrier or layer 16 is provided in the guiding area 10 as well as in the bearing area 11 with ribs 17 and 18 which assure the precise position of the sleeve bearing guide member 8 in the housing shells 13 and 14. The glide path 9 is not covered by the heat barrier 16. This applies also with regard to the back side 19 which is not in contact with the housing 12 thereby providing a spacing between the housing and the heat barrier 16 so that any generated heat is easily removed as by an air current.

With regard to FIGS. 6 and 7 it will be noted that in the guiding area 10 where the barrier 16 is in contact with the rib 20 and the shoulder 21 of the housing shells 13 and 14, the heat barrier 16 surrounds the sleeve bearing guide member on three sides. However, a heat barrier adjacent to only two sides of the guide member will also be sufficient. In this connection it should be mentioned that the sectional lines which in FIGS. 3 and 4 are identified by roman numerals IV—IV and VII—VII, refer to the Figure having the respective arabic numerals 4 and 7.

The advantages achieved by the invention reside especially in the fact that the simple and inexpensive construction comprising a two shell thermoplastics housing may be retained without any danger that parts subject to heat generation might cause a deformation, especially of the the housing. As a result, the precisely fixed position of the bearings and similar parts or tool members is assured and abnormal wear and tear is avoided. Accordingly, the useful life of the power tool is substantial increased and this has been achieved by surprisingly simple and expeditious means.

Examples of thermoplastic materials of which the present housing shells could be made are synthetic materials such as poly-amides, poly-ethylene, poly-carbonates, and mixed poly-merisates of styrene-acryl-nitriles.

The heat insulating layer as provided according to the invention could for example be made of duroplastic materials such as phenolic resins, expoxy resins and unsaturated poly-ester-resins.

The invention is not intended to be limited by the described embodiments nor to the example materials used. It is intended to cover all modifications and equivalents within the scope of the appended claims.

What I claim is:

1. A power tool comprising a housing made of heat sensitive material, means supported in said housing and subject to heating by increased temperatures during the operation of the power tool, and means made of duroplastic synthetic material for heat insulating said supported heat subjected means from said housing whereby the heat subjected means are kept out of direct contact with the housing.

2. The power tool according to claim 1, wherein said heat sensitive housing comprises supporting means in contact with said heat insulating means located at least at predetermined points between said housing supporting means and the means subject to heating.

3. The power tool according to claim 2, wherein said heat insulating means are provided in the form of a layer pressed about said supported means at said points.

4. The power tool according to claim 1, wherein said housing of heat sensitive material comprises two shells, said supported means comprising jig saw means including a sleeve bearing member having a supporting area and a guiding area, said heat insulating means being arranged to surround the supporting area of the sleeve bearing member and to contact said guiding area at least at two sides thereof.

5. The power tool according to claim 4; wherein said heat insulating means comprise ribs for fixing the position of said heat insulating means in said housing of heat sensitive material.

* * * * *